United States Patent
Balakrishnan et al.

(10) Patent No.: US 7,274,742 B2
(45) Date of Patent: Sep. 25, 2007

(54) MODEL AND MODEL UPDATE TECHNIQUE IN A SYSTEM FOR MODELING THE RELATIONSHIP OF THE BIT RATE OF A TRANSPORT STREAM AND THE BIT RATE OF AN ELEMENTARY STREAM CARRIED THEREIN

(75) Inventors: Jeyendran Balakrishnan, San Jose, CA (US); Shu Xiao, San Jose, CA (US)

(73) Assignee: SkyStream Networks Inc., Sunnyvale, CA (US)

( * ) Notice: Subject to any disclaimer, the term of this patent is extended or adjusted under 35 U.S.C. 154(b) by 807 days.

(21) Appl. No.: 10/641,322

(22) Filed: Aug. 13, 2003

(65) Prior Publication Data

US 2005/0038637 A1 Feb. 17, 2005

(51) Int. Cl.
*H04N 7/12* (2006.01)
*H04N 11/02* (2006.01)
*H04N 11/04* (2006.01)
*H04B 1/66* (2006.01)

(52) U.S. Cl. .............................................. 375/240.26
(58) Field of Classification Search ................. None
See application file for complete search history.

(56) References Cited

U.S. PATENT DOCUMENTS

| | | | |
|---|---|---|---|
| 5,537,408 A | 7/1996 | Branstad et al. | |
| 5,566,174 A | 10/1996 | Sato et al. | |
| 5,596,581 A | 1/1997 | Saeijs et al. | |
| 5,703,877 A | 12/1997 | Nuber et al. | |
| 5,835,668 A | 11/1998 | Yanagihara | |
| 6,002,687 A | 12/1999 | Magee et al. | |
| 6,167,084 A * | 12/2000 | Wang et al. | 375/240.02 |
| 6,639,943 B1 * | 10/2003 | Radha et al. | 375/240.11 |
| 6,806,909 B1 * | 10/2004 | Radha et al. | 348/384.1 |
| 2003/0002587 A1 | 1/2003 | Nguyen | |
| 2003/0043924 A1 | 3/2003 | Haddad et al. | |

\* cited by examiner

*Primary Examiner*—Nhon Diep
(74) *Attorney, Agent, or Firm*—Proskauer Rose LLP

(57) ABSTRACT

A method and system are disclosed for controlling the generation of a systems layer stream, such as a transport stream, that carries a program made up of at least one elementary stream, such as an encoded audio signal or an encoded video signal. The systems layer stream is made up of serial segments, such as packets, which contain information specific to the systems layer, such as headers, and segments of elementary stream data. The bit rate of one or more of the elementary streams is adapted in accordance with a dynamically changing relation that relates the bit rate of such elementary streams to the bit rate of the portion of the systems layer stream that carries them.

21 Claims, 5 Drawing Sheets

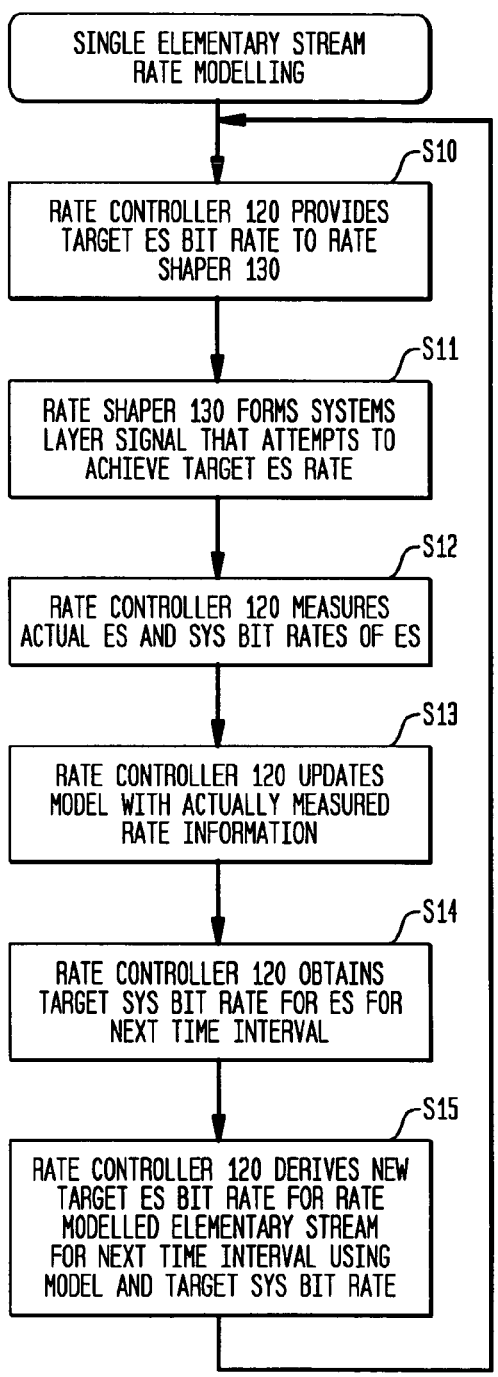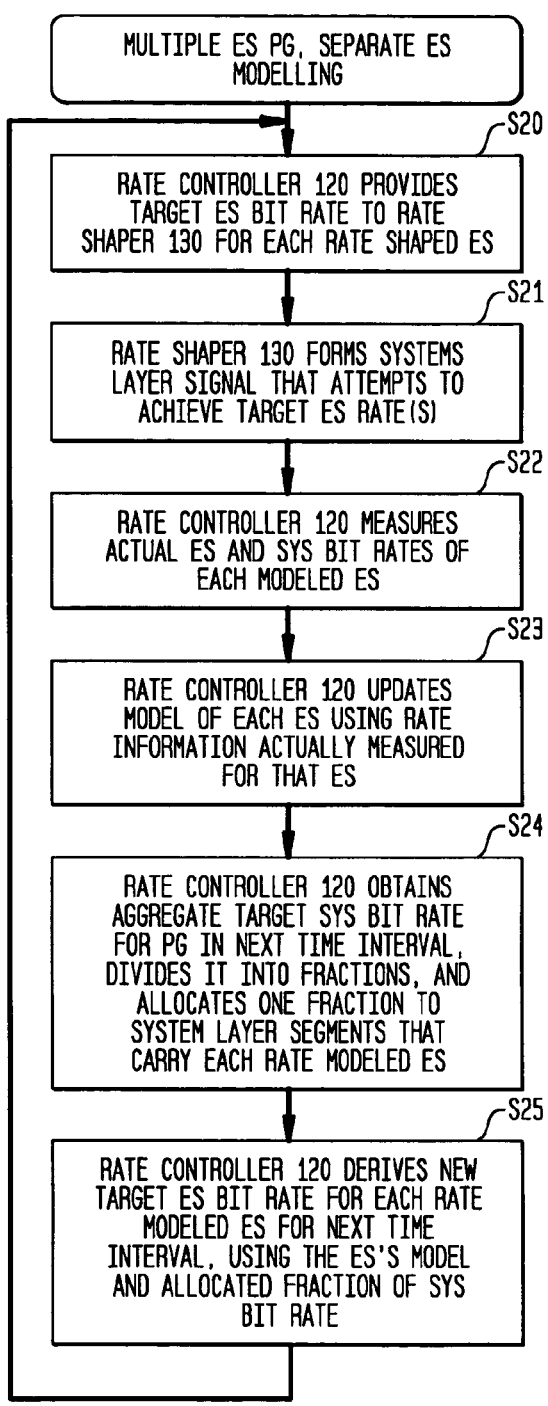

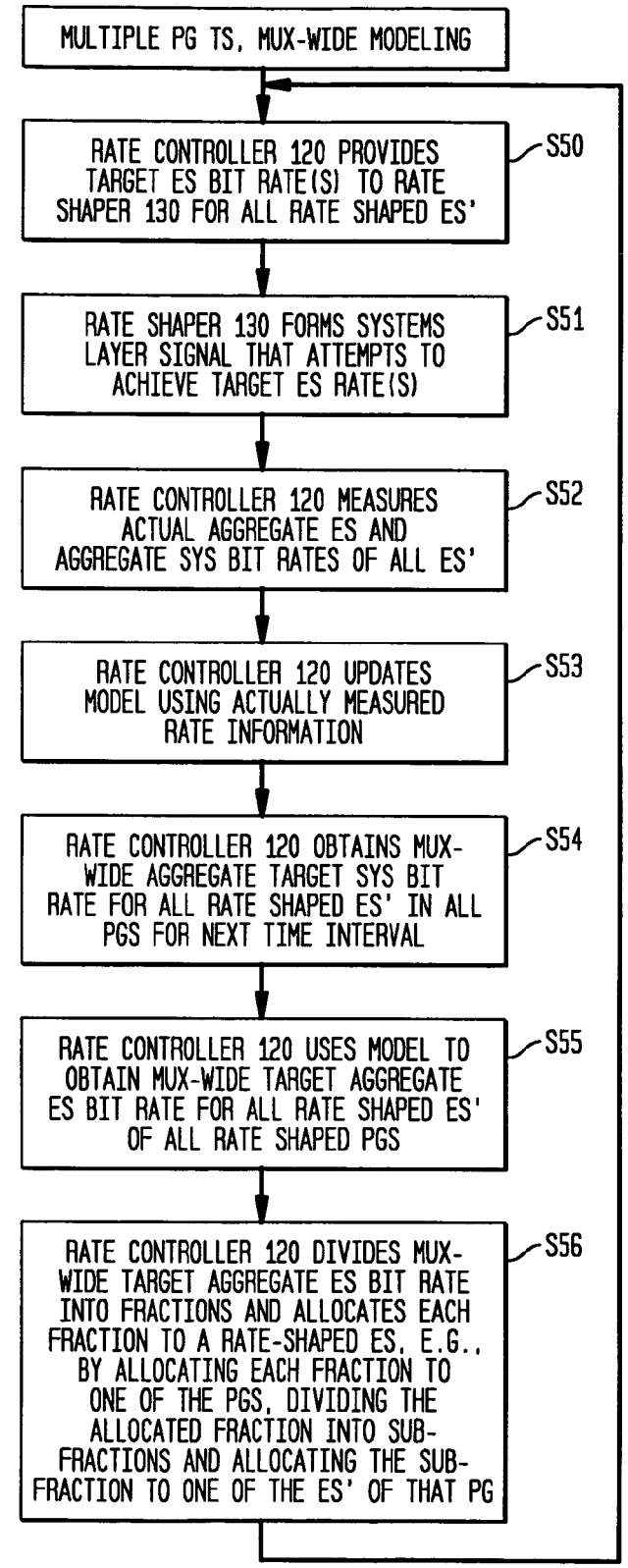

MODEL AND MODEL UPDATE TECHNIQUE IN A SYSTEM FOR MODELING THE RELATIONSHIP OF THE BIT RATE OF A TRANSPORT STREAM AND THE BIT RATE OF AN ELEMENTARY STREAM CARRIED THEREIN

RELATED APPLICATIONS

The subject matter of this application is related to the subject matter of the following U.S. patent applications, all of which are commonly assigned to the same assignee as is this application:

(1) U.S. patent application Ser. No. 10/640,872, filed concurrently herewith for Jeyendran Balakrishnan and Shu Xiao and entitled Method And System For Modeling The Relationship Of The Bit Rate Of A Transport Stream And The Bit Rate Of An Elementary Stream Carried Therein;

(2) U.S. patent application Ser. No. 10/640,871, filed concurrently herewith for Jeyendran Balakrishnan and Hemant Malhotra and entitled Method And System For Re-Multiplexing Of Content-Modified MPEG-2 Transport Streams Using PCR Interpolation;

(3) U.S. patent application Ser. No. 10/641,323, filed concurrently herewith for Jeyendran Balakrishnan and Hemant Malhotra and entitled Method and System for Time-Synchronized Forwarding of Ancillary Information in Stream Processed MPEG-2 Systems Streams; and (4) U.S. patent application Ser. No. 10/640,866, filed concurrently herewith for Jeyendran Balakrishnan and Hemant Malhotra and entitled Method and System for Re-multiplexing of Content Modified MPEG-2 Transport Streams using Interpolation of Packet Arrival Times.

The contents of the above-listed patent applications are incorporated herein by reference.

FIELD OF THE INVENTION

The present invention pertains to signals which are hierarchically organized into a systems layer stream and a lower layered elementary stream, where an elementary stream is streamed information of a component of a program, such as an audio signal or a video signal. An example of a systems layer stream is a transport stream. In particular, the invention pertains to control or adaptation of the bit rates of elementary streams relative to the bit rate of the system layer streams that carry them as well as system layer stream specific information, such as systems layer headers.

BACKGROUND OF THE INVENTION

This invention is described in the context of audio-video programs, which include at least one audio signal or one video signal. However, those of ordinary skill in the art will appreciate the applicability of this invention to other types of program signals.

A program signal is composed of one or more component signals referred to herein as elementary streams. An example of an elementary stream can be one (natural or synthetic) audio signal, one (natural or synthetic) video signal, one closed captioning text signal, one private data signal, etc. Several techniques are known for compressing, formatting, storing and conveying such elementary streams. For example, the MPEG-1, MPEG-2, MPEG-4, H.263, H.263++, H.26L, and H.264/MPEG-4 AVC standards provide well-known techniques for encoding (compressing and formatting) video. Likewise, MPEG-1 (including the so-called "MP3"), MPEG-2, MPEG-4 and Dolby AC-3, provide techniques for encoding audio.

In addition, there are several known techniques for combining elementary streams for storage or transmission. MPEG-2 defines a technique for segmenting each elementary stream into packetized elementary stream ("PES") packets, where each PES packet includes a PES packet header and a segment of the elementary stream as the payload. PES packets, in turn, may be combined with "pack headers" and other pack specific information to form "packs". Alternatively, the PES packets may be segmented into transport packets of a transport stream, where each transport packet has a transport packet header and a portion of a PES packet as payload. These transport packets, as well as others (e.g., transport packets carrying program specific information or DVB systems information, entitlement management messages, entitlement control messages, other private data, null transport packets, etc.) are serially combined to form a transport stream.

In another known technique according to MPEG-4 systems, elementary streams may be divided into "sync-layer" (or "SL") packets, including SL packet headers. SL packets may be combined with PES packet headers, to form PES packets, and these PES packets may be segmented and combined with transport packet headers to form transport packets. According to another technique, transport packets are not used. Rather, elementary stream data is segmented and real-time protocol ("RTP") packet headers are appended to each segment to form RTP packets. In addition, or instead, user datagram protocol ("UDP") or transmission control protocol ("TCP") packet headers may be appended to segmented data to form UDP or TCP packets. Many combinations of the above are possible including formatting the elementary streams into SL packets first and then formatting the SL packets into RTP packets, encapsulating transport packets into TCP packets according to the so-called multi-protocol encapsulation ("MPE"), etc.

Herein, the MPEG-2 PES and transport streams encapsulating MPEG-2 video will be used as a model for illustrating the invention. Also, this invention is illustrated using a hierarchical signal, wherein elementary streams are carried as segments in packets or cells of one or more higher layers. The term "systems layer" is herein used to refer to such higher layers. The MPEG-2 PES streams and transport streams will be used as a specific example of the systems layer. However, those skilled in the art will appreciate that other kinds of hierarchical layers may be used interchangeably as the systems layer for the elementary stream, such as the SL layer, the RTP layer, etc. Furthermore, "systems layer" need not be restricted to the "transport layer" according to the OSI seven layer model but can, if desired, include other layers such as the network layer (e.g., internet protocol or "IP"), the data link layer (e.g., ATM, etc.) and/or the physical layer. Also, other types of elementary streams, such as encoded audio, MPEG-4 video, etc. may be used. In addition, the term "transmission" is used herein but should be understood to mean the transfer of information under appropriate circumstances via a communications medium or storage medium to another device, such as an intermediate device or a receiver/decoder.

FIG. 1 illustrates the hierarchical nature of the transport stream. A video elementary stream is shown which contains multiple compressed pictures or video images I0, B1, B2, P3, B4, B5, P6, B7, B8, I9. It should be noted that each picture is presented over an integer multiple of a fixed interval of time (e.g., 1, 2 or 3 field periods), but can have a variable amount of information.

Next, the video elementary stream is segmented into payloads for PES packets. PES packets can contain a fixed length segment of elementary stream information or a variable length segment of elementary stream information. In the illustration of FIG. 1, each PES packet encapsulates the encoded information of the video elementary stream representing precisely one encoded video picture. This is not a strict requirement of MPEG-2 but is a requirement of other standards such as ATSC. However, other strategies can be used for segmenting the elementary stream into PES packets. For example, each PES packet may be restricted to have a fixed number of bytes in its payload and/or a fixed total number of bytes (i.e., the sum of the number of bytes in the PES packet header and the number of bytes in the PES payload may be a fixed number). This is especially true for different kinds of elementary streams (e.g., audio, synthetic images) or for different encoded formats (e.g., for MPEG-4). Note also that the headers of PES packets can vary in size, depending on the presence or absence of other PES layer information in the PES header such as: time stamps (e.g., presentation time stamps and/or decoding time stamps), trick mode control information, copyright information, and PES extension data.

The PES packets themselves are segmented and placed into transport packets. All MPEG-2 transport packets have a fixed length of 188 bytes. A transport packet has a minimum sized header of 4 bytes followed by a payload. The PES packets are divided into segments and each segment is placed in a payload of a transport packet. However, transport packet headers can also be of variable length depending on whether or not the transport header is also carrying: program clock reference (PCR) time stamps, discontinuity information, bit rate information, splice point information, padding, etc. For example, PCR's must be delivered at least at a certain frequency. However, PCR's can be delivered more frequently and need not be delivered at precise moments in time. Therefore, under normal circumstances, PCR's may be found in transport packets, nominally at a certain frequency, or more frequently, but not precisely at any frequency. Indeed, transport packets containing PCR's are often moved relative to other transport packets containing PCR's for the same program as a result of remultiplexing.

In the case of MPEG-2 video or audio elementary streams, PES packets can only contain data of one elementary stream. Also, transport packets can only contain data from one elementary stream. Moreover, when carrying MPEG-2 video or MPEG-2 audio, no transport packet can contain data from two PES packets (even if such PES packets carry data of the same elementary stream). Rather, the first byte of every PES packet must be aligned with the first byte of the payload of the transport packet that carries the beginning of the PES packet. But even in those cases where PES packets need not start precisely at the first payload byte of a transport packet, there can be no guarantee that the entire stream of PES packets will divide precisely into the total capacity of the payloads of the transport packets that carry the stream of PES packets. Thus, padding data is often placed within transport packets to align variable sized PES packets with the start of their respective payloads.

Many standards for encoding and transmitting elementary streams have requirements for maintaining a strict schedule for delivering the elementary stream data, the systems layer stream carrying it, or both. These requirements are intended to ensure that the information is delivered in a timely fashion to enable seamless presentation. Often, such requirements are analogous to a "just-in-time" inventory system; streamed information is controlled so that it is delivered at just the right time and at just the right rate to make sure that enough stream information is available for decoding and presentation without interruption or delay. However, the delivery requirements also are intended to ensure that no more information is delivered than there is available storage capacity to hold it pending decoding and presentation. Furthermore, the systems layer signal often must meet certain bit rate requirements of the channel that carries the system layer stream, such as a maximum bit rate, a minimum bit rate or even a certain constant bit rate. As such, bit rates of both elementary and systems layer streams must be carefully controlled from production to consumption.

In the MPEG-2 context, the prior art teaches a number of useful devices that operate on program signals, including encoders, editors, transcoders, splicers and remultiplexers. An encoder is a device that compresses and formats a raw unencoded elementary stream to produce an encoded elementary stream. Often, the encoder outputs the encoded elementary stream in a transport stream, possibly with other encoded elementary streams of the same program. An editor is a device that edits (modifies) an elementary stream and produces an edited encoded elementary stream. An editor can receive encoded or unencoded elementary streams at its input. A transcoder receives an already encoded elementary stream and re-encodes it, e.g., at a different bit rate, according to a different encoding standard, at a different resolution, using different encoding options, etc. A splicer is a device that appends one signal to another or inserts one signal in the middle of the first. For example, a splicer may append one encoded elementary stream at the end of another elementary stream in a program so that they will be presented seamlessly and in sequence. Alternatively, the splicer could insert one program in the middle of another, e.g., in the case of inserting a commercial in the middle of a television show. A remultiplexer is a device that combines or removes programs, substitutes one or more component streams for others in a program, or modifies systems layer information of a systems layer stream. Examples of these devices are described in U.S. Pat. Nos. 6,141,447, 6,002,687, 6,038,256, 6,094,457, 6,192,083, 6,005,621, 6,229,850, 6,310,915, 5,717,464, 5,859,660 and 5,861,919.

Some of the above devices have been specifically adapted to operate in an environment where the bit rate assigned to each program varies. Herein, the term "rate shaper" is used to refer to an encoder, transcoder, splicer, editor or remultiplexer which is specifically designed to produce a systems layer signal that meets a certain bit rate constraint. For example, during each of multiple successive intervals, the total bit rate available for carrying information (e.g., in a channel) may be divided into fractions and each fraction may be allocated to a respective one of multiple programs to be outputted in a systems layer stream, in the form of a transport stream during, that interval. Such a fraction may be set to guarantee a certain quality of service for its respective program.

Each allocated fraction of the bit rate is actually the bit rate allocated for all of the transport packets carrying all of the information specific to that program, including the information of the encoded video and audio elementary streams, the PES packet header information and the transport packet header information. Such information is typically provided to a video encoder circuit of the rate shaper. The video encoder, in turn, encodes, or transcodes, a video signal to produce a certain number of bits for transmission over that interval which is approximately equal to a target number of bits. Preferably, the encoding or transcoding is also performed in an attempt to minimize the amount of encoding noise or distortion introduced by such encoding or transcoding. In theory, the target number of bits is derived from the bit rate fraction allocated to the rate shaper containing the encoder with the intention that, if the target number of bits were produced exactly, the transport stream carrying that program over the interval should be transmitted at, or near, the allocated bit rate fraction communicated to the device.

Many techniques have been described for either allocating a fraction of the total bit rate to each of multiple programs or transport streams or for controlling video encoding or transcoding to most closely generate a number of bits equal to a given target number of bits. However, very little study has been made pertaining to an optimal technique for allocating a target systems layer stream bit rate between the elementary stream itself and the requisite systems layer information to carry it. Rather, the only known technique is to use a fixed, unvarying ratio to divide the transport stream bit rate bit rate between the systems layer information of that transport stream and the encoded video elementary stream of that transport stream. Indeed, the techniques employed are quite crude and require many assumptions such as: (1) the transport header will typically only be 4 bytes long, (2) time stamps will be inserted at a very regular schedule; (3) PES packet headers will be of fixed length, (4) the PES packetization technique is fixed, etc. Based on such information, a ratio is predetermined and is never varied in operation.

The problem with this technique is that it is too rigid. Time stamps are rarely located in the transport stream at precise times according to an unvarying, fixed length period. This is especially true if the transport stream has been remultiplexed, in which case PCR bearing transport packets may have been moved relative to other transport packets carrying information for the same program. PES packetization strategies can also vary according to content, standards or pure choice. For instance, PES packets are not even used in some packetization techniques, such as the technique above where encoded video is formatted into SL packets and the SL packets, in turn are formatted into RTP packets. The crude bit rate allocation techniques do not adequately address all PES packetization strategies or dynamic variance in packetization. Over estimating the relation between the number of bits needed for the systems layer relative to the number of bits for needed for the elementary stream layer results in a lower elementary stream bit count target for a given number of systems layer stream bits than could otherwise be accommodated. Under such circumstances, the compressed elementary stream tends to have a lower fidelity than would have been possible with a more accurate estimate. Likewise, under estimating the relation between the number of bits needed for the systems layer relative to the number of bits for needed for the elementary stream layer results in a higher elementary stream bit count target for a given number of systems layer stream bits than can be accommodated. Under these circumstances, the total number of bits for the systems layer signal tends to exceed the maximum number of bits that can be transmitted for that systems layer signal.

It is desirable to provide an improvement to the rate allocation strategies that specifically accommodates a variation in the allocation of bits or bit rate between one or more elementary streams and the systems layer stream(s) in which they are carried.

SUMMARY OF THE INVENTION

This and other objects are achieved according to the invention. According to one embodiment, a model is used which relates the ES bit rate of one elementary stream to the SYS bit rate of at least the portion of the systems layer signal that carries it. According to this embodiment, a method is provided for transmitting a program bearing systems layer signal (for example, a transport stream) comprising a plurality of sequential segments of systems layer information (for example, packets). Each of at least some of the systems layer segments comprises a segment of an elementary stream representing at least part of the program (for example, in the packet payload), and a segment of information specific to the systems layer but not any elementary stream (for example, the packet header). According to this embodiment, a dynamically updated model is maintained that relates an ES bit rate of the elementary stream (in the system layer segments of the plurality) to a SYS bit rate of ones of the systems layer segments of the systems layer stream. A first target value, related to a target for one of the ES or SYS bit rates, is generated. A second target value, related to a target for the other of the ES and SYS bit rates, is generated from the model and first target value. The generation of the sequential segments of the systems layer signal is controlled in an attempt to transmit the elementary stream and systems layer segments at bit rates corresponding to the first and second target values.

Illustratively, a third value representing the actual bit rate of the elementary stream, and a fourth value representing the actual bit rate of ones of the systems layer segments, generated as a result of the step of controlling, are determined. The model is then updated according to the third and fourth values.

Illustratively, the generation of the first and second target values, and the generation of the sequential segments of the system layer signals, are controlled during each of a plurality of successive time intervals. In addition or in the alternative, the third and fourth values can be determined, and the model updated, during each of a plurality of successive time intervals.

According to yet another embodiment, a model is used for a systems layer signal that carries a program that has multiple elementary streams. However, the model relates the bit rate of only one of the elementary streams of this program to the SYS bit rate of at least the portions of the systems layer signal carrying this elementary stream of that program. According to this embodiment, a method is provided for transmitting a program bearing systems layer signal (for example, a transport stream) comprising a plurality of sequential segments of systems layer information (for example, packets). Each of at least some of the systems layer segments of the plurality comprises a segment of an elementary stream representing at least part of the program (for example, in the packet payload), and a segment of information specific to the systems layer but not any elementary stream (for example, a packet header). The program carried in the transport stream comprises at least a first elementary stream and a second elementary stream that is different from the first elementary stream. According to this embodiment, a first target value is generated. The first target value represents a target for an aggregate bit rate of at least first and second ones of the systems layer segments in the transport stream comprising segments of the first elementary stream of the program and of the second elementary stream of the program, respectively. A portion of the first target value is allocated to the first ones of the systems layer segments that comprise segments of the first elementary stream of the program. At least a first dynamically updated model is maintained that relates an ES bit rate of the first elementary stream of the program, to a SYS bit rate of at least the first ones of the systems layer segments that comprise segments of the first elementary stream. A second target value representing a target for the ES bit rate of the first elementary stream of the program, is generated from the portion of the first target value allocated to the first ones of the systems layer segments and the model. The generation of the sequential segments of the systems layer signal is controlled in an attempt to transmit at least the first elementary stream at a bit rate corresponding to the second target value.

According to another embodiment, a model is used in a systems layer signal that carries a program having multiple elementary streams. However, the model relates the aggregate ES bit rate of multiple elementary streams of the program to the SYS bit rate of at least the portions of the systems layer signal that carry these elementary streams. According to this embodiment, a method is provided for transmitting a program bearing system layer signal (for example, a transport stream) comprising a plurality of sequential segments of systems layer information (for example, packets). Each of at least some of the systems layer segments of the plurality comprises a segment of an elementary stream representing at least part of the program (for example, in the packet payload), and a segment of information specific to the systems layer but not any elementary stream (for example, a packet header). The program carried in the systems layer signal comprises a plurality of different elementary streams. According to this embodiment, a dynamically updated model is maintained. The model relates an ES bit rate, which is an aggregate bit rate of a plurality of the elementary streams of the program, to a SYS bit rate of at least ones of the systems layer segments in the systems layer signal comprising the plurality of elementary streams of the program. A first target value representing a target for the SYS bit rate is generated. A second target value representing a target for the ES bit rate is generated from the first target value and the model. A portion of the second target value is allocated to each of the plurality of elementary streams. The generation of the sequential segments of the systems layer signal is controlled in an attempt to transmit each of the plurality of elementary streams at a bit rate corresponding to a respective portion of the second target value allocated to the corresponding one of the elementary streams.

According to a further embodiment, a model is used for a systems layer signal that carries multiple programs. The model relates an ES bit rate for at least one elementary stream of only one program to the SYS bit rate of at least the portions of the systems layer signal that carry the elementary stream(s) to which the ES bit rate pertains. According to this embodiment, a method is provided for transmitting a systems layer signal (for example, a transport stream) bearing at least a first program and a second program that is different from the first program. The systems layer signal comprises a plurality of sequential segments of systems layer information (for example, packets). Each of at least some of the systems layer segments of the plurality comprises a segment of an elementary stream representing at least part of one of the first and second programs, and a segment of information specific to the systems layer but not any of the elementary streams (for example, a packet header). According to this embodiment, a first target value is generated that represents a mux-wide target for an aggregate bit rate for segments of the systems layer signal bearing elementary stream data of the first program and systems layer segments bearing elementary stream data of the second program. A portion of the first target value is allocated to the systems layer segments bearing elementary stream data of the first program. At least a first dynamically updated model is maintained that relates a SYS bit rate of the systems layer segments bearing elementary stream data of the first program, to an ES bit rate of the elementary stream data of the first program. A second target value representing a target for the ES bit rate, is generated from the portion of the first target value allocated to the systems layer segments bearing the first program and the model. The generation of the sequential segments of the systems layer signal is controlled in an attempt to transmit elementary stream data of the first program at a bit rate corresponding to the second target value.

Illustratively, the first program has at least one particular elementary stream and the ES bit rate, to which the model relates the SYS bit rate, corresponds to the bit rate of only the one particular elementary stream of the first program. In such a case, the generation of the second target value includes the following additional steps. A fraction of the portion of the first target value is allocated to only those systems layer segments bearing the one particular elementary stream of the first program. The second target value is generated using the model, that relates the ES bit rate of only the one particular elementary stream to the SYS bit rate of the systems layer segments that carry it, and the allocated fraction of the first target value.

Alternatively, the first program comprises a plurality of elementary streams and the ES bit rate, to which the model relates the SYS bit rate, corresponds to an aggregate ES bit rate of the plurality of elementary streams of the first program. In such a case, the generation of the second target value includes the following additional steps. A third target value of the aggregate bit rate of the systems layer segments that carry the plurality of the elementary streams of the first program is generated using the model, that relates the aggregate ES bit rate of the plurality of elementary streams of the first program to the SYS bit rate of the systems layer segments that carry them, and the first portion. A fraction of the third target value is then allocated as the second value.

In yet another illustration, more than one model is maintained, i.e., a first model is used for a first one of the programs, a second model is used for a second one of the programs, etc. These models may be of the same type or different types of models.

According to yet a further embodiment, a model is used which relates the aggregate ES bit rate of plural elementary streams of plural programs to the SYS bit rate of at least the portions of the systems layer signal that carry these plural elementary stream of the plural programs. A method is provided according to this embodiment for transmitting a systems layer signal (for example, a transport stream) bearing a plurality of programs comprising a plurality of sequential segments of systems layer information (for example, packets). Each of at least some of the systems layer segments of the plurality comprises a segment of an elementary stream representing at least part of one of the programs, and a segment of information specific to the systems layer but not any elementary stream (for example, a packet header). According to this embodiment, a dynamically updated model is maintained that relates a SYS bit rate of at least the systems layer segments comprising a plurality of elementary streams of a plurality of the programs, to an ES bit rate which is an aggregate bit rate of the plurality of elementary streams of the plurality of programs. A first target value representing a target for the SYS bit rate is generated. A second target value representing a target for an aggregate bit rate of the plurality of elementary streams of the plurality of programs is generated from the first target value and the model. At least a first portion of the second target value is allocated to a plurality of the elementary streams of a particular one of the programs. At least a second portion of the first portion of the second target value is allocated to a particular one of the plurality of the elementary streams of the particular one program. The generation of the sequential segments of the systems layer signal is controlled in an attempt to transmit at least the particular one of the plurality of elementary streams of the particular one of the programs at a bit rate corresponding to the second portion of the first portion of the second target value.

According to yet another embodiment, a method is provided for processing a digital program bearing systems layer signal. A systems layer signal comprising sequentially disposed systems layer segments is provided. Each of at least some of the systems layer segments comprises a segment of an elementary stream and a segment of information specific to the systems layer but not any elementary stream. The following steps are then performed for each of a plurality of successive time intervals. A first value that relates a bit rate of one or more elementary streams to a bit rate of particular ones of the systems layer segments containing the one or more elementary streams, is dynamically determined. The bit rate of the one or more elementary streams, or the particular systems layer segments, is then varied as a function of the determined first value.

Illustratively, second and third values are measured. The second value depends on the actual bit rate of the one or more elementary streams whose bit rate is varied during a particular one of the time intervals. The third value depends on the bit rate, during the same particular time interval, of the particular ones of the systems layer segments, containing the one or more elementary streams. The first value is dynamically determined as a function of the second and third values.

Illustratively, an unknown parameter vector is used to model the relationship of the bit rate of at least one of the one or more elementary streams to the bit rate of system layer segments containing that "at least one" elementary stream. The second and third values are used to estimate the unknown parameter vector. The first value is determined from a function applied to the estimate of the parameter vector.

Other embodiments of the invention describe particular models, and model update techniques.

According to one embodiment, a method is provided for modeling the relationship between a systems layer bit rate and an elementary stream layer bit rate in a systems layer signal. The systems layer bit rate is the bit rate of certain systems layer segments transmitted serially in the systems layer signal. Each systems layer segment comprises a segment of elementary stream information, and a segment of information specific to the system layer but not any elementary stream. The elementary stream layer bit rate is the bit rate of elementary stream segments of certain one or more elementary streams. According to this embodiment, a first value representing the actual systems layer bit rate and a second value representing the actual elementary stream layer bit rate during a given time interval are measured. The first and second measured values are used to estimate a finite vector of parameters. A model that relates a third value representing the systems layer bit rate to a fourth value representing the elementary stream layer bit rate is dynamically adapted. The model comprises the estimated vector of parameters and a function, wherein the function can be applied to the estimated vector of parameters and one of the third or fourth values to derive the other of the third and fourth values. One of the third value or the fourth value is used to control the systems layer bit rate, the elementary stream layer bit rate, or both, during a time interval following the given time interval. These steps are then repeated.

Illustratively, the model is of the following form with the vector of parameters derived from first and second values $$g_0(R_E, R_T) = g^T(R_E, R_T)\theta$$

where: $g(R_E, R_T) = (g_1(R_E, R_T), \ldots, g_M(R_E, R_T))^T$
$R_E$ is the fourth value,
$R_T$ is the third value corresponding to $R_E$,
$\theta$ is the vector of $M \geq 1$ parameters,
$\theta$ is an $i^{th}$ parameter of the vector $\theta$, where $1 \leq i \leq M$, and
$g_0, g_1, \ldots, g_M$ are known continuous functions.

Illustratively, different models can be sued such as:
(1) a linear model:

$$R_T = \alpha R_E \text{ or } R_E = R_T/\alpha$$

(2) an affine model:

$$R_T = \alpha R_E + \beta \text{ or } R_E = (R_T - \beta)/\alpha$$

(3) a non-linear square root model:

$$R_T = \alpha R_E + \gamma R_E^{1/2} + \beta \text{ or } R_E = \{((\gamma^2 + 4\alpha(R_T - \beta))^{1/2} - \gamma)/(2\alpha)\}^2$$

(4) a non-linear rate dependent ratio model:

$$R_T = (\alpha + \gamma/R_T)R_E + \beta,$$

such that:

$$R_T = (\beta + \alpha R_E + ((\beta + \alpha R_E)^2 + 4\gamma R_E)^{1/2})/2 \text{ or } R_E = ((R_T - \beta)R_T)/(\alpha R_T + \gamma),$$

where: $\alpha$, $\beta$ and/or $\gamma$ are the dynamically adjustable parameters of the vector of parameters.

BRIEF DESCRIPTION OF THE DRAWINGS

FIG. 3 is a flow chart illustrating a single elementary stream model.

FIG. 4 is a flow chart illustrating a multiple elementary stream program, single elementary stream model.

FIG. 7 is a flow chart illustrating a multiple program transport stream, multiplex-wide model.

DETAILED DESCRIPTION OF THE INVENTION

As mentioned above, the present invention is illustrated herein using an MPEG-2 transport and PES stream, collectively, as an example of a systems layer signal, and an MPEG-2 elementary stream (e.g., an encoded video or audio signal), as an example of a lower layer hierarchical signal carried by the systems layer signal, without loss of generality.

Rate Shaper Architecture

Figure 1:
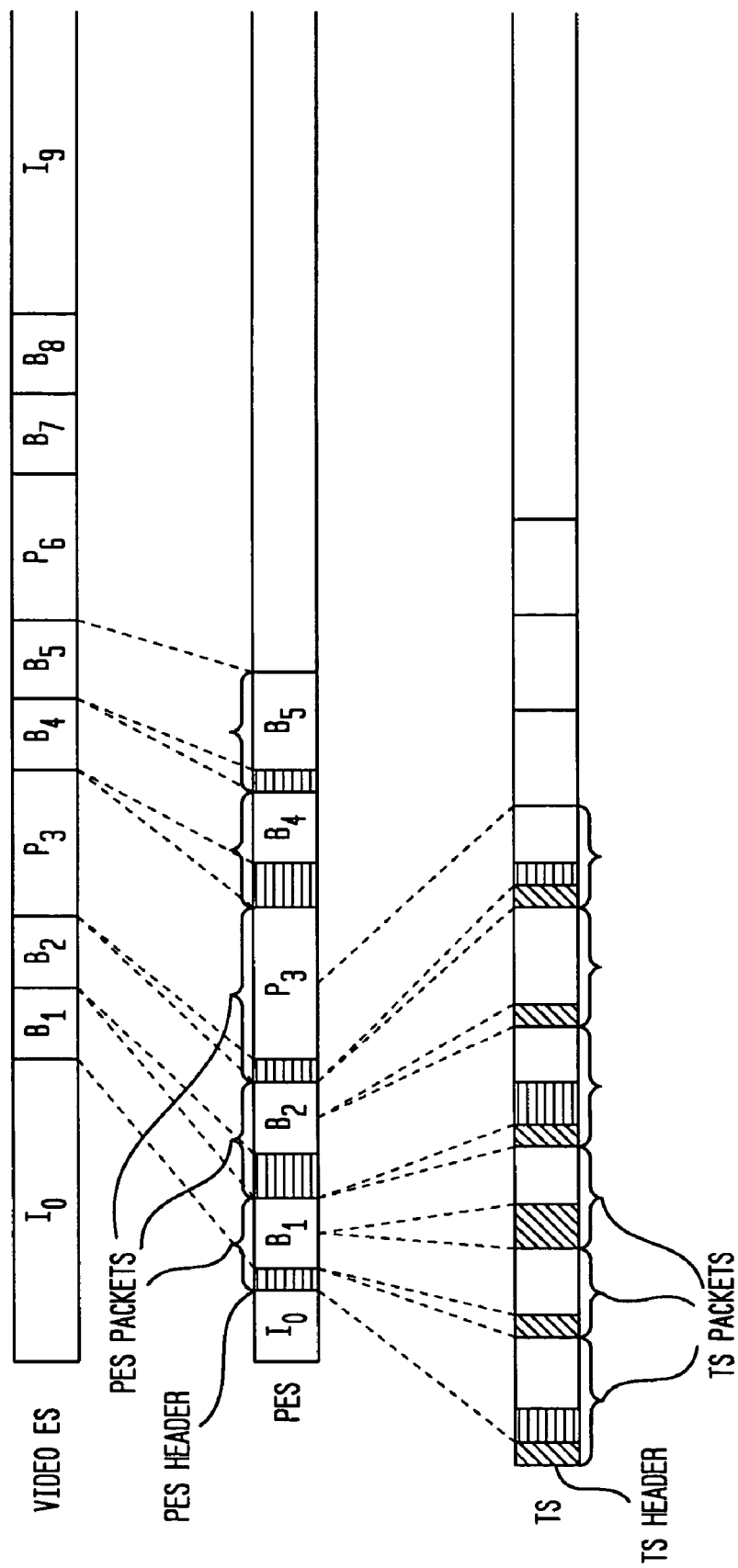
FIG. 1 illustrates the hierarchical nature of a transport stream.
Figure 2:
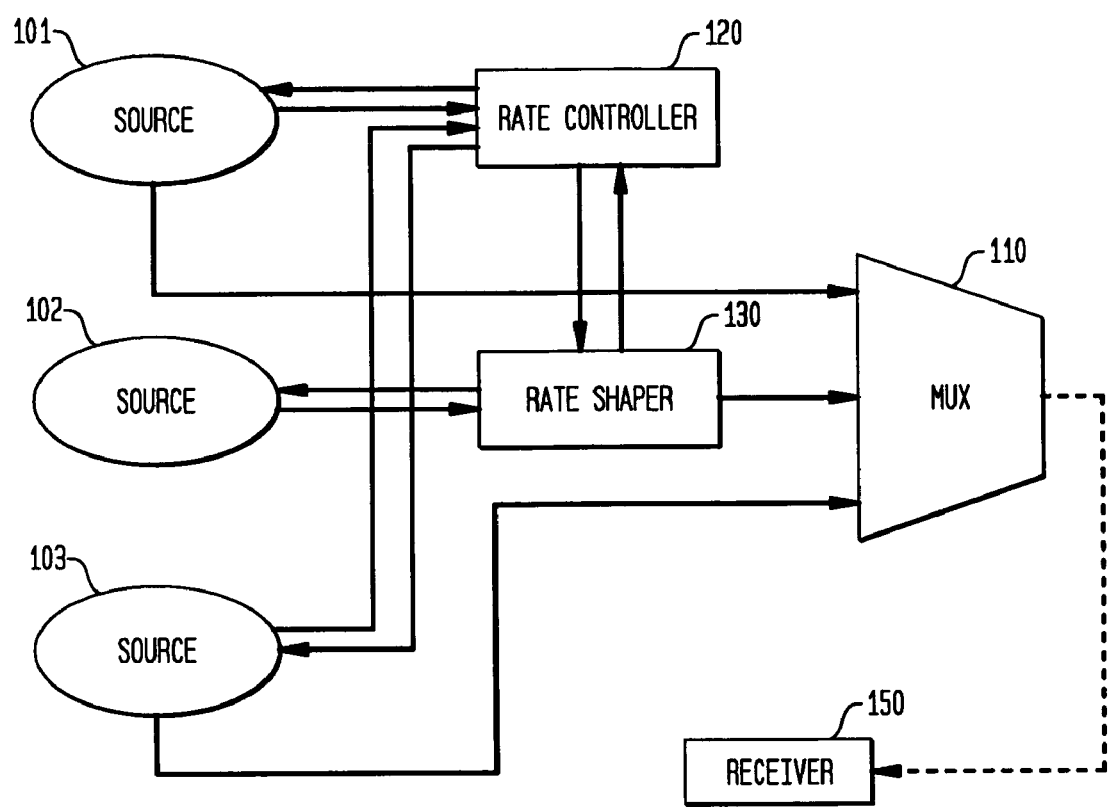
FIG. 2 illustrates one embodiment of the present invention.

FIG. 2 shows an arrangement employing the invention according to one embodiment. Transport streams (or other systems layer signals) are supplied from sources 101 and 102 to a multiplexer 110, which may also be a remultiplexer. An elementary stream bearing signal is also supplied from a source 103 to a rate shaper 130 which processes it, and outputs a transport stream. The rate shaper 130 may be an encoder, transcoder, editor, splicer or remultiplexer. Illustratively, the rate shaper 130 may be implemented, at least in part, using one or more Mediaplex 20™ video services routers, or Source Media Routers™ provided by SkyStream Networks™, Inc., a company located in Sunnyvale, Calif. However, other devices, such as computer terminals or encoder circuits, may be provided in addition, or in the alternative, to form the rate shaper 130. The inputted elementary stream bearing signal supplied from the source 103 may be a raw, unencoded elementary stream such as an analog or digital video signal, an encoded elementary stream, a PES stream carrying the elementary stream, a transport stream carrying the elementary stream, a transport stream carrying a single program with multiple elementary streams or a transport stream carrying multiple programs. In addition, the rate shaper 130 may actually receive multiple input signals and/or produce multiple output signals. However, for sake of clarity, but without loss of generality, this invention is illustrated below for a rate shaper 130 that receives one input signal and produces one output signal. The output signal produced by the rate shaper 130 is received at an input of a receiver 150. The receiver 150 can be any suitable downstream apparatus, including, an encoder, splicer, multiplexer, remultiplexer demultiplexer, transcoder, decoder (e.g., set top box, television, etc.), router (such as the Edge Media Router™ or Edge Video Router™ produced by SkyStream Networks Inc). The input of the receiver 150 can be connected to the multiplexer 110 output by a simple link, such as a wire, coaxial cable, wireless transceiver, etc., by one or more intermediate devices or by a network, such as a telephone, terrestrial, cable, satellite or computer network.

The sources 101-103 may be suitable video input jacks, tape players, optical or magnetic disk drivers, memory circuits (e.g., flash memory), antennae, demodulators, cameras, synthetic elementary stream generator computers, etc. Information about at least the transport stream produced by the rate shaper 130 is provided to a rate controller 120 which may be implemented using any known arrangement of circuitry for performing the measurement and calculation features described below. One suitable arrangement is a processor, software and associated memory within the Mediaplex 20™ or Source Media Routers™ described above. However, a separate computer terminal may also be provided instead, or to assist in the performance of the tasks, of the rate controller 120 (described below). As shown, the rate controller 120 may also perform rate control, at least at a systems stream level, for the sources 101 and 102.

In general, during each of plural successive time intervals, the rate shaper 130 receives one or more dynamically determined values from rate controller 120 that relate the bit rate of at least one elementary stream outputted from the rate shaper 130 and the bit rate of at least the systems layer information that carries such elementary stream data from the rate shaper 130. For example, the value can simply be a ratio of bit rates, or a ratio of total number of bits, of an elementary stream and the systems layer stream that carries it. Preferably, the value is simply the number of bits to produce (or bit rate) for the elementary stream, where the rate shaper 130 also obtains, or otherwise knows, the number of bits to produce (or bit rate) for the transport stream that carries it. In the alternative, the value is simply the number of bits to produce (or bit rate) for the transport stream carrying the elementary stream, where the rate shaper 130 also obtains, or already knows, the number of bits to produce (or bit rate) for that encoded elementary stream. As will be described below, one feature which distinguishes the operation of the rate shaper 130 from prior art devices is that the value provided by the rate controller 120 will depend on a dynamically varying relationship of bit rates between an elementary stream and a systems layer stream.

Given the value, the rate shaper 130 processes the input signal (e.g., encodes, transcodes, edits, splices and/or remultiplexes the signal). The rate shaper 130 performs such processing to produce an output transport stream in a rate controlled fashion, specifically to produce an elementary stream (or transport stream that carries it) whose bit rate matches the bit rate indicated or represented by the value provided by the rate controller 120. Thus, the rate shaper 130 varies the bit rate of one or more elementary streams, and/or the systems layer segments that carry them, as a function of the values provided by the rate controller 120. Illustratively, the rate shaper 130 attempts to generate an output transport stream having a ratio of an elementary stream bit rate to a systems layer bit rate that matches as closely as possible the ratio on which the value depends.

Of course, it is not always possible for the rate shaper 130 to precisely achieve the same bit rate represented by the target value provided by the rate controller 120. Thus, statistics are gathered that are related to the actual bit rate of at least one of the elementary streams and the actual bit rate of the portion of the systems layer stream that carries the at least one elementary stream. The rate shaper 130 can, for example, measure this information itself and communicate that information to the rate controller 120. However, it is also possible for the rate controller 120 to actively monitor and perform the measurement. An example of measured values can be a count of the actual number of bits of an elementary stream, and a count of the actual number of bits of the systems layer stream segments or packets that carries it, produced by the rate shaper 130 for output.

Given such information, the rate controller 120 can dynamically determine, i.e., estimate and adapt, a subsequent value to be provided to the rate shaper 130 during a subsequent time interval. To achieve this end, the rate controller 120 maintains a model that relates the bit rates of one or more of the elementary streams outputted from the rate shaper 130 (and possibly others) to the corresponding systems layer stream outputted by the rate shaper 130 (and possibly others). The rate controller 120 illustratively updates its internal model(s). Based on the updated model, the rate controller 120 produces a new value for output to the rate shaper 130 to control its generation of a transport stream. In one mode of operation, a target bit rate is set for the systems layer to be outputted from the rate shaper 130, such as the total transport stream bit rate, the transport stream bit rate of only the transport packets that carry one specific program, or the transport stream bit rate of only the transport packets that carry one specific elementary stream. The rate controller 120 uses this systems layer target bit rate and the model to derive a target bit rate for the elementary stream itself. In the alternative, the rate controller 120 may set a target bit rate for the elementary stream and instead use this elementary stream target bit rate and the model to derive the target bit rate of the systems layer (e.g., the whole transport stream bit rate, the bit rate of the transport packets bearing only the program containing the elementary stream or the bit rate for only the transport packets containing the elementary stream).

The above steps illustratively are iterated over multiple successive intervals. Thus, a rate controller 120 maintains a model based on predetermined initialized values. During a first interval, the rate controller 120 uses the model to produce a value for output to the rate shaper 130. The rate shaper 130 produces a transport stream in a controlled fashion in an attempt to meet the bit rate criterion specified by the value. Also during that interval, the rate controller 120 measures the actual elementary stream and systems layer bit rates and updates its model based on these measured bit rates. The updated model is then used in the subsequent time interval to provide a value for controlling the generation of a transport stream by the rate shaper 130.

Stream Selection for Monitoring and Control

According to the invention, different combinations of streams may be related by the model maintained in the rate controller 120. These are described below.

1. Single Elementary Stream Modeling

In this scenario, only one elementary stream is to be modeled. The model relates the bit rate of one elementary stream of a particular program to the systems layer segments (transport packets) that carry it. This model can be used to derive an elementary stream bit rate (or bit count) given a target bit rate for the systems layer segments that carry the elementary stream. In the alternative, the model can be used to derive the bit rate of the systems layer segments that carry an elementary stream, given a bit rate allocated to the elementary stream. For sake of brevity, the discussion below illustrates the case where a target bit rate is allocated for the systems layer segments that carry the elementary stream and the model is used to derive the bit rate of such an elementary stream from the systems stream target rate. An analogous technique may be used for the other case.

Referring to FIG. 3, the following steps S10-S15 recited below are then iterated over each (successive) time interval. Initially, the rate controller 120 provides one or more values to the rate shaper 130 to use in generating the systems layer stream which represents the target elementary stream bit rate, such as a target elementary stream bit count (step S10). On the first iteration, a predetermined value may be used which may be generated off-line or approximated.

The rate shaper 130 performs suitable processing and produces a systems layer stream in such fashion as to attempt to achieve an elementary bit rate that most closely matches the elementary stream target bit rate indicated by the value provided by the rate controller 120 (step S11). The rate controller 120 measures a value representing the actual bit rate of the elementary stream (such as the actual number of elementary stream bits produced during that time interval) and a value representing the actual bit rate of the systems layer segments that carry this elementary stream (such as the actual number of bits produced over the same time interval for the transport packets that carry the elementary stream) (step S12). Using such information, the rate controller 120 adapts the model (step S13).

Next, the rate controller 120 generates or obtains a value representing the target bit rate allocated to the systems layer segments that carry the elementary stream for the next or a subsequent time interval (such as a target number of bits to be produced for such transport packets) (step S14). Using this target value and the model (as adapted), the rate controller 120 generates or derives a new value representing the target bit rate for the elementary stream carried by the systems layer segments (such as a target number of bits to be produced for the elementary stream) (step S15). The rate controller 120 then provides this new value representing the target bit rate for the elementary stream to the rate shaper 130 (step S10).

As may be appreciated, this process iteratively and dynamically adapts the model that relates systems layer stream bit rate to elementary stream bit rate, based on the actual bit rates of systems layer segments (transport packets) and the single elementary stream they carry.

2. Multiple Elementary Stream Program, Separate Elementary Stream Modeling

In this scenario, a single program is presumed to have multiple elementary streams whose rates require modeling, albeit, with separate models. Again, each model relates a bit rate of a single elementary stream to the bit rate of the systems layer segments (transport packets) that carry that elementary stream. However, it is presumed that an initial bit rate is provided for the whole program, which must first be divided on a per-elementary stream basis.

Referring to FIG. 4, the following steps S20-S25 recited below are then iterated over each (successive) time interval. As above, the rate controller 120 provides to the rate shaper 130 one or more values for each elementary stream modeled by the rate controller 120 and rate shaped by the rate shaper 130 (step S20). For example, the rate controller 120 may provide for each elementary stream a value representing the respective target elementary stream bit rate.

The rate shaper 130 performs suitable processing and produces a systems layer stream in such fashion as to attempt to achieve an elementary bit rate for each rate shaped elementary stream that most closely matches the target bit rate indicated by the values provided by the rate controller 120 (step S21). The rate controller 120 measures a value representing the actual bit rate of each rate modeled/rate shaped elementary stream and values representing the actual bit rates of the systems layer segments that carry these elementary streams (step S22). (Thus, separate values are measured for each group of transport packets that carry a corresponding one of the rate modeled/rate shaped elementary streams. Separate values are also measured for each elementary stream.) The rate controller 120 then adapts each model with corresponding values—a model used for a particular elementary stream is adapted with the value representing the actual bit rate measured for that particular elementary stream and the value representing the actual bit rate measured for only the systems layer segments that carry it (step S23). Thus, the rate controller 120 adapts the model that relates the bit rate of a first elementary stream to the bit rate of the systems layer segments that carry first elementary stream with the values representing the actual bit rates measured for the first elementary stream and the systems layer segments that carry it. The model that relates the bit rate of a second elementary stream to the bit rate of the systems layer segments that carry this second elementary stream is adapted with the values representing the actual bit rates measured for the second elementary stream and the systems layer segments that carry it, etc.

The rate controller 120 generates or obtains the aggregate target bit rate allocated, for the next time interval, to the systems layer segments that carry the entire program composed of the multiple elementary streams (step S24). First, the rate controller 120 divides this aggregate target bit rate into fractions and allocates each fraction of this entire aggregate target bit rate to the systems layer segments (step S24). More specifically, a first fraction is allocated to the systems layer segments that carry a first elementary stream, a second fraction is allocated to the systems layer segments that carry a second elementary stream, etc. Illustratively, any well-known technique may be used for dividing and allocating this aggregate bit rate. For example, some techniques estimate a relative need of bits among all encoded elementary streams. Usually, a requirement of bits can be estimated from a perceived encoding difficulty to achieve a certain fidelity. Perceived difficulty may be approximated based on an actually measured "difficulty," such as a requirement of bits, or level of noise introduced into an encoded signal, from a previous time interval. Other criteria may also be used. Then, the available bit rate is allocated in an attempt to equalize quality among all elementary streams by allocating a fraction of the available bit rate that is proportional to the relative requirement of bits estimated for the respective elementary stream (step S24).

For each model, the rate controller uses the respective allocated fraction of the aggregate target bit rate and the model (as adapted) to generate or derive the new target value representing the target bit rate for the corresponding elementary stream carried by the systems layer segments (step S25). The rate controller 120 then provides each of these new target values representing the respective target bit rate for each corresponding elementary stream to the rate shaper 120 (step S20).

3. Multiple Elementary Stream Program, Program Modeling

As in the multiple elementary stream program scenario discussed above, in this scenario, a single program is presumed to have multiple elementary streams whose rates require modeling. However, a single model is maintained which relates all of the elementary stream bit rates, in aggregate, to the bit rate of the systems layer segments that carry such elementary streams.

Figure 5:
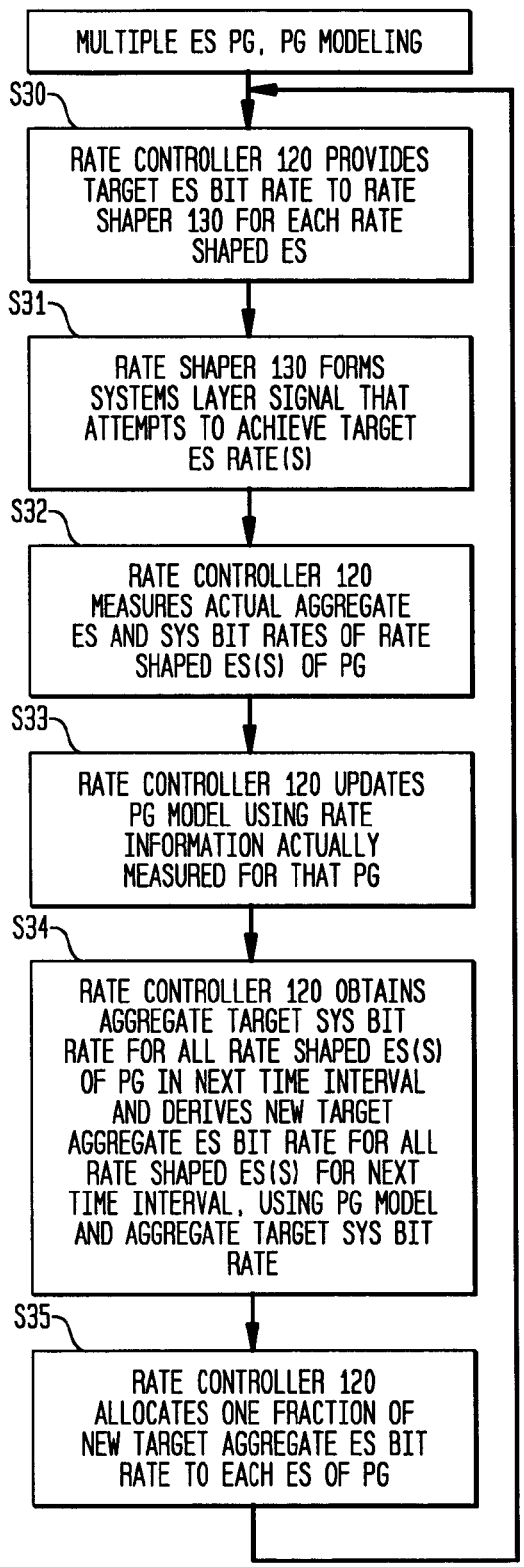
FIG. 5 is a flow chart illustrating a multiple elementary stream program, program model.

Referring to FIG. 5, the following steps (S30-S35) recited below are then iterated over each (successive) time interval. In this scenario, the rate controller 120 provides to the rate shaper 130 one value for each elementary stream to be rate shaped by the rate shaper 130 (although only one model is used for all of the elementary streams of the program, collectively) (step S30). Each value represents a respective one of the target elementary stream bit rates.

The rate shaper 130 performs suitable processing and produces a systems layer stream in such fashion as to attempt to achieve a bit rate for each rate shaped elementary stream that most closely matches the target bit rate indicated by the values provided by the rate controller 120 (step S31). The rate controller 120 measures a value representing the actual aggregate or total bit rate of all of the rate shaped elementary streams (collectively), and a value representing the actual bit rate of all of the systems layer segments that carry these elementary streams (step S32). Preferably, this is two values, namely, a first, single value representing the aggregate bit rate of all of the rate shaped elementary streams and a second value representing the bit rate of all of the systems layer segments that carry them. Using such information, the rate controller 120 adapts its single model (step S33).

The rate controller 120 obtains or generates a value representing the target bit rate allocated, for the next time interval, to the systems layer segments that carry all of the multiple rate shaped elementary streams of the program (step S34). The rate controller 120 uses the allocated target value representing systems layer bit rate and the model (as adapted) to generate or derive a value representing the target aggregate bit rate for all of the rate shaped elementary streams (step S34). Preferably, this is a single value representing the sum of the target bit rates for all of the rate shaped elementary streams of that program.

Next, the rate controller 120 divides this aggregate target value derived for all of the rate shaped elementary streams of the program into fractions and allocates each fraction of the aggregate target value to a different one of the rate shaped elementary streams of the program (step S35). Each of these fractions is the new value representing the target bit rate for a respective one of the rate shaped elementary streams of the program. Again, any well-known rate allocation technique illustratively may be used for dividing the aggregate target value for allocation. As noted above, some techniques estimate a relative need of bits among all encoded elementary streams where a need or requirement of bits can be estimated from a perceived encoding difficulty to achieve a certain fidelity. Perceived difficulty may be approximated based on an actually measured "difficulty," such as a requirement of bits, or level of noise introduced into an encoded signal, from a previous time interval. Of course, other criteria may also be used. The available bit rate is then allocated in an attempt to equalize quality among all elementary streams by allocating a fraction of the available bit rate that is proportional to the relative requirement of bits estimated for the respective elementary stream or some other fraction that is expected to average the fidelity over each elementary stream. The rate controller 120 then provides each of these new values representing the respective target bit rate for each corresponding elementary stream to the rate shaper 130 (step S30).

4. Multiple Program Transport Stream, Program Modeling

In this scenario, the rate shaper 130 is presumed to be rate shaping multiple programs in a single systems layer signal. The rate controller 120 models each program separately.

Note that the rate controller 120 may use either the "Multiple Elementary Stream Program, Separate Elementary Stream Modeling" technique (2) or the "Multiple Elementary Stream Program, Program Modeling" technique (3) (described above) to model each program.

Figure 6:
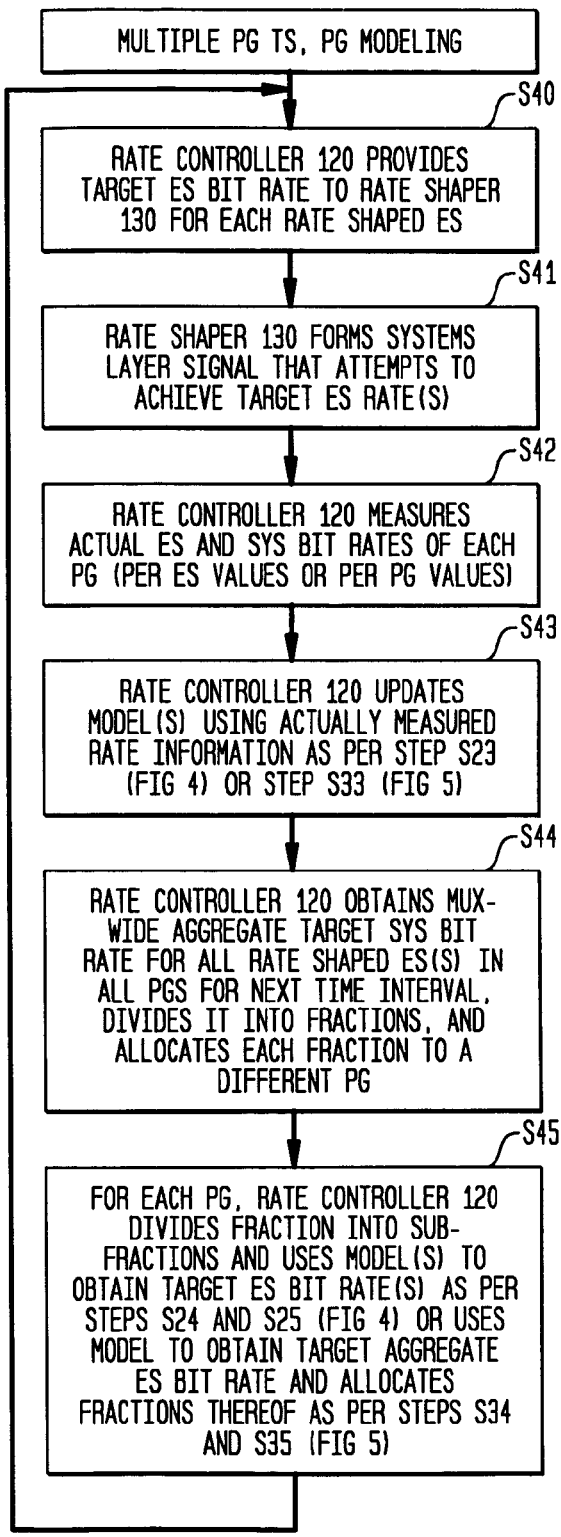
FIG. 6 is a flow chart illustrating a multiple program transport stream, program model.

Referring to FIG. 6, the following steps S40-S45 recited below are then iterated over each (successive) time interval. Initially, the rate controller 120 provides to the rate shaper 130 one value for each elementary stream rate to be shaped by the rate shaper 130 (step S40). In this case, the rate shaper 130 shapes the bit rate of multiple programs. Each value represents a target bit rate for a respective one of the elementary streams.

The rate shaper 130 performs suitable processing and produces a systems layer stream in such fashion as to attempt to achieve an elementary bit rate for each rate shaped elementary stream, of each program, that most closely matches the target bit rate represented by the corresponding value provided by the rate controller 120 (step S41). For each program, the rate controller 120 measures values representing actual systems layer stream and elementary stream bit rates (step S42). The particular values measured for a respective program depend on whether the rate controller 120 uses the "Multiple Elementary Stream Program, Separate Elementary Stream Modeling" technique (2) or the "Multiple Elementary Stream Program, Program Modeling" technique (3) described above. In the first case, the rate controller 120 measures a value representing the actual bit rate of each rate modeled/rate shaped elementary stream and values representing the actual bit rates of the systems layer segments that carry these elementary streams (step S22 of FIG. 4). (Thus, separate values are measured for each group of transport packets that carry a corresponding one of the rate modeled/rate shaped elementary streams. Separate values are also measured for each elementary stream.) The rate controller 120 then adapts each model with corresponding values—a model used for a particular elementary stream is adapted with the value representing the actual bit rate measured for that particular elementary stream and the value representing the actual bit rate measured for only the systems layer segments that carry it (step S43 and step S23 of FIG. 4). Thus, the rate controller 120 adapts the model that relates the bit rate of a first elementary stream to the bit rate of the systems layer segments that carry first elementary stream with the values representing the actual bit rates measured for the first elementary stream and the systems layer segments that carry it. The model that relates the bit rate of a second elementary stream to the bit rate of the systems layer segments that carry this second elementary stream is adapted with the values representing the actual bit rates measured for the second elementary stream and the systems layer segments that carry it, etc.

In the second case, the rate controller 120 measures a value representing the actual aggregate bit rate of all of the rate shaped elementary streams (collectively), and a value representing the actual bit rate of all of the systems layer segments that carry these elementary streams in aggregate (step S32 of FIG. 5). Preferably, this is two values, namely, a single first value representing the bit rate of all of the rate shaped elementary streams and a second value representing the bit rate of all of the systems layer segments that carry them. Using such information, the rate controller 120 adapts its single model for the respective program (step S43, step S33 of FIG. 5).

The rate controller 120 generates or obtains a value representing the "multiplex-wide" target bit rate allocated, for the next time interval, to the systems layer segments that carry multiple rate shaped elementary streams of multiple rate shaped programs over the entire multiplex (step S44). First, the rate controller 120 divides the multiplex-wide target value into fractions and allocates each fraction to a different one of the rate-shaped programs (step S44). Thus, a first rate shaped program is allocated a first fraction of the multiplex-wide target value, a second rate-shaped program is allocated a second fraction of the multiplex-wide target value, etc. Any well-known technique may be used for dividing and allocating. For each rate shaped program, the rate controller 120 uses the respective allocated fraction of the multiplex-wide target value and model (as adapted) to generate or derive one or more values representing target bit rates for the rate shaped elementary streams of that program. Again, the next steps performed depend on which modeling technique is used by the rate controller 120 to model that specific program.

In the case that the "Multiple Elementary Stream Program, Elementary Stream Modeling" technique (2) described above is used, the rate controller 120 first divides this fraction of the multiplex-wide target value into sub-fractions (step S45, step S24 of FIG. 4). The rate controller 120 then distributes each sub-fraction amongst the systems layer segments of that program (step S24 of FIG. 4). More specifically, a first sub-fraction is allocated to the systems layer segments that carry a first elementary stream of the program, a second sub-fraction is allocated to the systems layer segments that carry a second elementary stream of the same program, etc. Illustratively, any well-known technique may be used for dividing the fraction of the multiplex-wide target value into sub-fractions and allocating each sub-fraction. For each model, the rate controller uses the respective allocated sub-fraction of the multiplex-wide target value and the model (as adapted) to generate or derive a new value representing the target bit rate for the corresponding elementary stream (step S25 of FIG. 4). The rate controller 120 then provides each of these new values representing the respective target bit rate for each corresponding elementary stream to the rate shaper 130 (step S40, step S20 of FIG. 4).

In the case that the "Multiple Elementary Stream Program, Program Modeling" technique (3) described above is used, the rate controller 120 uses the allocated fraction of the multiplex-wide target value and its single model for the program to generate or derive a single target value representing the target aggregate bit rate for all of the rate shaped elementary streams belonging to that program (step S45, step S34 of FIG. 5). The rate controller 120 then divides this aggregate target bit rate value derived for all of the rate shaped elementary streams of the program into fractions and allocates each fraction of the aggregate bit rate target value to a different one of the rate shaped elementary streams (step S35 of FIG. 5). Each of these fractions is the new value representing the target bit rate for a respective one of the rate shaped elementary streams of the program. Illustratively, any well-known rate allocation technique may be used for dividing the aggregate target bit rate value into fractions for allocation. The rate controller 120 then provides each of these new target bit rate values representing the respective target bit rate for each corresponding elementary stream to the rate shaper 130 (step S40, Step S30 of FIG. 5).

As noted above, the rate controller 120 uses different models for each program. Each model can be of the same type, e.g., multiple elementary stream, single elementary stream model as in technique (2), multiple elementary stream program, program modeling as in technique (3), etc. Alternatively, different models can be selected for each program.

5. Multiple Program Transport Stream, Multiplex-Wide Modeling

In this scenario, the rate controller 120 maintains a single model for the entire multiplex. This model relates the bit rate of the systems layer segments carrying all of the rate shaped elementary streams (for all of the rate shaped programs) to an aggregate bit rate equal to the sum of all of the bit rates of all of the rate shaped elementary streams (of all of the rate shaped programs).

Referring to FIG. 7, the following steps S50-S56 are then iterated over successive time intervals. Initially, for each rate shaped elementary stream, the rate controller 120 provides to the rate shaper 130 one value representing the target bit rate of that respective elementary stream (step S50).

The rate shaper 130 rate-shapes each of the elementary streams of each of the rate shaped programs and produces a systems layer stream containing them (step S51). Again, the rate shaper 130 attempts to produce a systems layer stream in such fashion that the bit rate of each elementary stream carried therein most closely matches the respective target bit rate indicated by the respective target bit rate value supplied by the rate controller 120.

The rate controller 120 next measures two values, namely, a first value representing the aggregate bit rate of all of the rate shaped elementary streams of all of the rate shaped programs, and a second value representing the aggregate bit rate of all of the systems layer segments that carry them (step S52). Using these values, the rate controller 120 dynamically adapts its single model (step S53).

Next, the rate controller 120 generates or obtains a value representing the multiplex-wide target bit rate for all of the systems layer segments carrying all of the rate shaped elementary streams of all of the rate shaped programs in the multiplex (step S54). Using this multiplex-wide target value and the model, the rate controller 120 generates or derives a value representing the target aggregate bit rate of all of the rate shaped elementary streams of all of the rate shaped programs in the multiplex (step S55). The rate controller 120 then divides this derived aggregate target bit rate value into fractions and allocates a different fraction to each of the rate shaped elementary streams using any allocation technique (step S56). This may be performed in two steps. First, the derived aggregate target bit rate value may be divided into fractions, including one fraction for each rate shaped program (step S56). Then, for each program, the fraction allocated to that program may be further divided into sub-fractions and each sub-fraction may be allocated to a respective rate shaped elementary stream of that rate shaped program (where one sub-fraction is allocated to each rate shaped elementary stream of that given program) (step S56). In any event, the fractional (sub-fractional) target values allocated, respectively, to their corresponding rate shaped elementary streams serve as the new target bit rate values representing the target bit rates to be used in controlling the generation of the systems layer stream. Most notably, the new target bit rate values are to be used for rate shaping each corresponding elementary stream, on the next subsequent time interval (step S50).

Models and Model Updating

The description above describes different modeling techniques. This section describes the actual models that may be employed, and techniques for updating them.

Each model comprises a vector of one or more dynamically updated parameters $\theta$, and a predefined function $f()$ that is applied to the vector of parameters $\theta$ and the value representing the elementary stream bit rate $R_E$ to derive the value representing the systems layer stream bit rate $R_T$. Illustratively, the function $f()$ is chosen such that it is invertible to derive $R_E$ from $R_T$ and $\theta$. Thus:

$$R_T = f(R_E, \theta) \text{ and } R_E = f^{-1}(R_T, \theta).$$

Illustratively, $\theta$ is adapted dynamically in real time according to actually measured values representing $R_T$ and $R_E$. To this end, the function $f(R_E, \theta)$ is chosen such that the following linear relationship may be used to derive the vector of parameters $\theta$:

$$g_0(R_E, R_T) = g^T(R_E, R_T)\theta$$

where: $g(R_E, R_T) = (g_1(R_E, R_T), \ldots, g_M(R_E, R_T))^T$
$\theta$ is the vector of $M \geq 1$ parameters,
$\theta_i$ is an $i^{th}$ parameter of the vector $\theta$, where $1 \leq i \leq M$, and
$g_0, g_1, \ldots, g_M$ are known continuous functions.

From this general expression, several techniques may be used for estimating the parameters. See L. LJUNG, SYSTEM IDENTIFICATION THEORY FOR THE USER, Second Edition (1999) (ISBN 0-13-656695-2). For example, according to a finite data, least squares method, a window of N+1 pairs $(R_{En}, R_{Tn})$ of values of the vectors $R_E$ and $R_T$ representing the elementary stream and systems layer stream bit rates, respectively, are obtained, where $0 \leq n \leq N$. The vector of parameters $\theta$ is then derived from:

$$\theta = (A^T A)^{-1} A^T b$$

where: $b = (g_0(R_{E0}, R_{T0}), g_0(R_{E1}, R_{T1}), \ldots, g_0(R_{EN}, R_{TN}))^T$
A is a matrix of full column rank M, and
$A = (g(R_{E0}, R_{T0}), g(R_{E1}, R_{T1}), \ldots, g(R_{EN}, R_{TN}))^T$.

In the alternative, any recursive technique may be used to derive the vector of parameters. According to a normalized least means squares recursive technique, the vector of parameters $\theta_{n+1}$, for use in the n+1$^{th}$ time interval, is derived from the values $R_{Tn}$, $R_{En}$, representing the elementary stream and systems layer stream bit rates obtained in the n$^{th}$ given interval according to:

$$\theta_{n+1} = \theta_n - \eta e_n g^T(R_{En}, R_{Tn})/(a + g^T(R_{En}, R_{Tn}) \cdot g(R_{En}, R_{Tn})$$

where: $e_n = g_0(R_{En}, R_{Tn}) - g^T(R_{En}, R_{Tn}) \cdot \theta_n$,
$\theta_n$ is a vector of parameters used in the n$^{th}$ given time interval,
$\eta$ is a gain factor selected such that $0 < \eta < 2$, and a is a positive constant.

Another recursive technique is the recursive least squares with exponential forgetting. According to this technique, the vector of parameters $\theta_n$ for use in the n+1$^{th}$ time interval is derived from the values $R_{Tn}$, $R_{En}$ representing the elementary and systems layer bit rates obtained in the n$^{th}$ given interval according to:

$$\theta_n = \theta_{n-1} + \frac{P_{n-1} g(R_{En}, R_{Tn})}{\lambda + g^T(R_{En}, R_{Tn}) P_{n-1} g(R_{En}, R_{Tn})} e_n;$$

where: $\theta_0$ is the initial estimate of the parameter
$P_n$ is an M×M matrix recursively defined by:

$$P_n = \lambda^{-1} P_{n-1} - \lambda^{-1}\left(\frac{P_{n-1} g(R_{En}, R_{Tn}) g^T(R_{En}, R_{Tn}) P_{n-1}}{\lambda + g^T(R_{En}, R_{Tn}) P_{n-1} g(R_{En}, R_{Tn})}\right),$$

$$e_n = g_0(R_{En}, R_{Tn}) - g^T(R_{En}, R_{Tn})\theta_{n-1}.$$

$P_{-1}$ is equal to any positive definite matrix, and
$\lambda$ is a forgetting factor set to $0 < \lambda \leq 1$.

Several model functions, and vectors of parameters are now described. The model may be a linear model having the following functions $R_T = f(R_E, \theta)$ and $R_E = f^{-1}(R_T, \theta)$ that relate $R_T$ and $R_E$:

$$R_T = \alpha R_E \text{ and } R_E = R_T/\alpha$$

where:
$\alpha$ is the sole dynamically adjustable parameter of the vector of parameters.

In this case, the following substitutions to the general model may be used for updating the vector of parameters $\theta = \alpha$; $M = 1$; $g_0(R_E, R_T) = R_T$; $g(R_E, R_T) = R_E$. The sole parameter $\alpha$ may be estimated each interval using any of the techniques described above.

This model is fairly simplistic. The parameter $\alpha$ denotes a best estimate between the ratio of the (systems layer stream) transport stream and the elementary stream bit rates or bit counts. This model is not the most accurate and is best suited for the case where PES headers are inserted once for every fixed number of encoded elementary stream bits. In this case, the ratio of the PES information amount/rate to elementary stream information amounts/rate is fairly fixed. Also, this model tends to work better at very high bit rates where the overhead number of bits required to carry inserted PCR's is negligible.

The model may also be an affine model having the following functions $R_T=f(R_E,\theta)$ and $R_E=f^1(R_T,\theta)$ that relate $R_T$ and $R_E$:

$$R_T=\alpha R_E+\beta \text{ and } R_E=(R_T-\beta)/\alpha$$

where:

$\alpha$ and $\beta$ are the dynamically adjustable parameters of the vector of parameters.

In this case, the following substitutions to the general model may be used for updating the vector of parameters $\theta=(\alpha, \beta)$: $M=2$; $g_0(R_E,R_T)=R_T$; $g(R_E,R_T)=(R_E,1)^T$. The vector of parameters $\theta=(\alpha, \beta)$ may be estimated each interval using any of the techniques described above.

The affine model tends to produce a better result that the linear model because the provision of the constant $\beta$ better accounts for the constant overhead in (systems layer segment) transport packet bit count arising by the pseudoperiodic insertion of the PCR. If PCR's are inserted at precise periodic intervals, then $\beta$ can be determined off-line and then fixed during system operation. However, the PCR insertion rate is rarely precisely fixed and therefore it is beneficial to adapt $\beta$ "on-line" i.e., dynamically in real time. This model also performs well for low bit rates where PCR insertion overhead is not negligible. As before, the parameter $\alpha$ denotes a best estimate between the ratio of the (systems layer stream) transport stream and elementary stream bit rates or bit counts.

In the alternative, a non-linear square root model may be used, which has the following functions $R_T=f(R_E,\theta)$ and $R_E=f^1(R_T,\theta)$ that relate $R_T$ and $R_E$:

$$R_T=\alpha R_E+\gamma R_E^{1/2}+\beta \text{ and } R_E=\{((\gamma^2+4\alpha(R_T-\beta))^{1/2}-\gamma)/(2\alpha)\}^2$$

where:

$\alpha$, $\beta$ and $\gamma$ are the dynamically adjustable parameters of the vector of parameters. Preferably, $\alpha \geq 188/184$, $\beta \geq 0$ and $\gamma \geq 0$ for the case where 188 byte transport packets, with headers containing at least 4 bytes, are used for the systems layer.

In this case, the following substitutions to the general model may be used for updating the vector of parameters $\theta=(\alpha, \gamma, \beta)^T$: $M=3$; $g_0(R_E,R_T)=R_T$; $g(R_E,R_T)=(R_E,R_E^{1/2},1)^T$. The vector of parameters $\theta=(\alpha, \gamma, \beta)^T$ may be estimated each interval using any of the techniques described above.

This model may provide the most optimal results for a transport stream carrying elementary streams containing encoded video pictures. Specifically, this model is well suited to handle PCR insertion overhead, as well as the following two PES packetization strategies: (a) where PES headers are inserted every fixed number of bits of the elementary stream or (b) where PES headers are inserted every encoded picture carried within the elementary stream. Case (b) is specifically accommodated by the term $\gamma R_E^{1/2}$. The reason is as follows. For very large bit rates, the ratio of $R_T$ to $R_E$ is determined primarily by the term $\alpha R_E$, and not the term $\gamma R_E^{1/2}$, which tends towards zero for very high $R_E$. This tends to accurately model the actual impact of the ratio of $R_T$ to $R_E$. Specifically, at very high bit rates, the small amount of PES header information, which does not scale up with the increased number of bits produced for each picture at higher bit rates $R_E$, is small or negligible.

One other model worth mentioning is the nonlinear rate-dependent ratio model. This model has the following functions $R_T=f(R_E,\theta)$ and $R_E=f^1(R_T,\theta)$ that relate $R_T$ and $R_E$:

$$R_T=(\alpha+\gamma/R_T)R_E+\beta,$$

such that:

$$R_T=(\beta+\alpha R_E+((\beta+\alpha R_E)^2+4\gamma R_E)^{1/2})/2 \text{ and } R_E=((R_T-\beta)R_T)/(\alpha R_T+\gamma),$$

where:

$\alpha$, $\beta$ and $\gamma$ are the dynamically adjustable parameters of the vector of parameters.

Again, preferably, $\alpha \geq 188/184$, $\beta \geq 0$ and $\gamma \geq 0$ for the case where 188 byte transport packets, with headers containing at least 4 bytes, are used for the systems layer.

In this case, the following substitutions to the general model may be used for updating the vector of parameters $\theta=(\alpha, \gamma, \beta)^T$: $M=3$; $g_0(R_E,R_T)=R_T$; $g(R_E,R_T)=(R_E, R_E/R_T,1)^T$. The vector of parameters $\theta=(\alpha, \gamma, \beta)^T$ may be estimated each interval using any of the techniques described above.

This model is similar to the nonlinear square root model described above and has a similar behavior. Specifically, as the transport stream rate tends to infinity, the ratio produced by the model tends to $\alpha \geq 188/184$.

The invention achieves the following advantages:

(1) The invention adaptively determines the best relationship between elementary stream bit rate/counts and transport stream bit rate/counts for any rate shaping system or device that generates or modifies elementary streams, in order to output a transport stream intending to meet specified quality of service specifications.

(2) The invention can be used dynamically, i.e., in real time, while the rate shaping system is in operation.

(3) The invention can be used for any elementary stream, including both video and audio.

(4) The invention can be used in any type of rate shaping device, such as an encoder, transcoder, editor, splicer or remultiplexer.

(5) Perceptual quality is improved in the elementary streams as a result of stricter adherence to bit rate constraints and thus more optimal use of bits for encoded information (i.e., fewer bits need be set aside as a "tolerance" to accommodate an unexpected peak amount of encoded information).

(6) The invention is a supplement to systems layer stream or transport stream bit rate allocation algorithms and can be used with virtually any algorithm.

(7) The invention can be used for single program systems layer or transport streams as well as multiple program systems layer or transport streams.

(8) In the case of multiple program systems layer or transport streams, the relationship between bit rates of elementary streams to (systems layer streams) transport streams can be controlled independently for each program or controlled jointly over all programs.

(9) The invention can be used with any systems layer packetization strategy and automatically adapts to dynamic changes in systems layer packetization strategy. In addition, the invention supports simultaneous use of different systems layer packetization strategies for each of multiple bit rate controlled elementary streams.

(10) The invention can be used with any PCR or other time stamp insertion strategy and automatically adapts to dynamic changes in the time stamp insertion strategy. In addition, the invention supports simultaneous use of different time stamp insertion strategies for each of multiple bit rate controlled elementary streams.

(11) The invention automatically adapts to random insertion of optional (systems layer) transport stream header, PES header or other intermediate layer data such as stuffing, private data, trick mode information, copyright information, etc.

The invention has been described herein with reference to specific embodiments solely for sake of brevity and illustration. Those skilled in the art can derive numerous alternative embodiments without departing from the spirit and scope of the following claims.

The invention claimed is:

1. A method of modeling the relationship between a systems layer bit rate and an elementary stream layer bit rate in a systems layer signal, the systems layer bit rate being the bit rate of certain systems layer segments transmitted serially in the systems layer signal, each systems layer segment comprising a segment of elementary stream information, and a segment of information specific to the system layer but not any elementary stream, the elementary stream layer bit rate being the bit rate of elementary stream segments of certain one or more elementary streams, the method comprising the steps of:

(a) measuring a first value representing the actual systems layer bit rate and a second value representing the actual elementary stream layer bit rate during a given time interval,
   (b) using the first and second measured values to estimate a finite vector of parameters,
   (c) dynamically adapting a model that relates a third value representing the systems layer bit rate to a fourth value representing the elementary stream layer bit rate, wherein the model comprises the estimated vector of parameters and a function, wherein the function can be applied to the estimated vector of parameters and one of the third or fourth values to derive the other of the third and fourth values,
   (d) using one of the third value or the fourth value to control the systems layer bit rate, the elementary stream layer bit rate, or both, during a time interval following the given time interval, so as to generate a rate-adjusted output systems layer signal containing the elementary stream data, where the elementary stream data of the output systems layer signal has a bit rate that matches the one or both of the third value or the fourth value used to control the systems layer bit rate, and
   (e) repeating steps (a)-(d).

2. The method of claim 1 wherein the model is of the following form with the vector of parameters derived from first and second values:

$$g_0(R_E, R_T) = g^T(R_E, R_T)\theta$$

where: $g(R_E, R_T) = (g_1(R_E, R_T), \ldots, g_M(R_E, R_T))^T$
   $R_E$ is the fourth value,
   $R_T$ is the third value corresponding to $R_E$, $\theta$ is the vector of $M \geq 1$ parameters,
   $\theta_i$ is an $i^{th}$ parameter of the vector $\theta$, where $1 \leq i \leq M$, and
   $g_0, g_1, \ldots, g_M$ are known continuous functions.

3. The method of claim 1 wherein the model is a linear model:

$$R_T = \alpha R_E \text{ or } R_E = R_T/\alpha$$

where: $R_E$ is the fourth value,
   $R_T$ is the third value corresponding to $R_E$,
   $\alpha$ is the sole dynamically adjustable parameter of the vector of parameters.

4. The method of claim 1 wherein the model is an affine model:

$$R_T = \alpha R_E + \beta \text{ or } R_E = (R_T - \beta)/\alpha$$

where: $R_E$ is the fourth value,
   $R_T$ is the third value corresponding to $R_E$,
   $\alpha$ and $\beta$ are the dynamically adjustable parameters of the vector of parameters.

5. The method of claim 1 wherein the model is a non-linear square root model:

$$R_T = \alpha R_E + \gamma R_E^{1/2} + \beta \text{ or } R_E = \{((\gamma^2 + 4\alpha(R_T - \beta))^{1/2} - \gamma)/(2\alpha)\}^2$$

where: $R_E$ is the fourth value,
   $R_T$ is the third value corresponding to $R_E$,
   $\alpha$, $\beta$ and $\gamma$ are the dynamically adjustable parameters of the vector of parameters.

6. The method of claim 1 wherein the model is a non-linear rate dependent ratio model:

$$R_T = (\alpha + \gamma/R_T)R_E + \beta,$$

such that:

$$R_T = (\beta + \alpha R_E + ((\beta + \alpha R_E)^2 + 4\gamma R_E)^{1/2})/2 \text{ or } R_E = ((R_T - \beta)R_T)/(\alpha R_T + \gamma),$$

where: $R_E$ is the fourth value,
   $R_T$ is the third value corresponding to $R_E$,
   $\alpha$, $\beta$ and $\gamma$ are the dynamically adjustable parameters of the vector of parameters.

7. The method of claim 2 further comprising the steps of:

(f) obtaining a window of N+1 pairs of first and second values $(R_{Tn}, R_{En})$ of the vectors $R_T$ and $R_E$, respectively, each pair of first and second values being measured at a different time interval n, where $0 \leq n \leq N$,
   (g) deriving the vector of parameters $\theta$ from:

$$\theta = (A^T A)^{-1} A^T b$$

where: $b = (g_0(R_{E0}, R_{T0}), g_0(R_{E1}, R_{T1}), \ldots, g_0(R_{EN}, R_{TN}))^T$
   A is a matrix of full column rank M, and $A = (g(R_{E0}, R_{T0}), g(R_{E1}, R_{T1}), \ldots, g(R_{EN}, R_{TN}))^T$.

8. The method of claim 2 further comprising the steps of:

(f) deriving the vector of parameters $\theta_{n+1}$, for use in the $n+1^{th}$ time interval, from the first and second values $R_{Tn}$, $R_{En}$, obtained in the nth given time interval from:

$$\theta_{n-1} = \theta_n - \eta e_n g^T(R_{En}, R_{Tn})/(\alpha + g^T(R_{En}, R_{Tn}) \times g(R_{En}, R_{Tn}))$$

where: $e_n = g_0(R_{En}, R_{Tn}) - g^T(R_{En}, R_T) \times \theta_n$,
   $\theta_n$ is a vector of parameters used in the $n^{th}$ given time interval,
   $\eta$ is a gain factor selected such that $0 < \eta < 2$, and
   $\alpha$ is a positive number.

9. The method of claim 2 further comprising the steps of:

(f) deriving the vector of parameters $\theta_n$ for use in the $n^{th}$ time interval from the first and second values $R_{Tn}$, $R_{En}$ obtained in the $n^{th}$ given interval from:

$$\theta_n = \theta_{n-1} + \frac{P_{n-1} g(R_{En}, R_{Tn})}{\lambda + g^T(R_{En}, R_{Tn}) P_{n-1} g(R_{En}, R_{Tn})} e_n;$$

where: $\theta_0$ is the initial estimate of the parameter $P_n$ is an M×M matrix recursively defined by:

$$P_n = \lambda^{-1} P_{n-1} - \lambda^{-1}\left(\frac{P_{n-1}g(R_{En}, R_{Tn})g^T(R_{En}, R_{Tn})P_{n-1}}{\lambda + g^T(R_{En}, R_{Tn})P_{n-1}g(R_{En}, R_{Tn})}\right),$$

$$e_n = g_0(R_{En}, R_{Tn}) - g^T(R_{En}, R_{Tn})\theta_{n-1}.$$

$P_{-1}$ is equal to any positive definite matrix, and $\lambda$ is a forgetting factor set to $0<\lambda<1$.

10. A system for modeling the relationship between a systems layer bit rate and an elementary stream layer bit rate in a systems layer signal, the systems layer bit rate being the bit rate of certain systems layer segments transmitted serially in the systems layer signal, each systems layer segment comprising a segment of elementary stream information, and a segment of information specific to the system layer but not any elementary stream, the elementary stream layer bit rate being the bit rate of elementary stream segments of certain one or more elementary streams, the system comprising:

a rate controller for repeatedly measuring a first value representing the actual systems layer bit rate and a second value representing the actual elementary stream layer bit rate during a given time interval, for repeatedly using the first and second measured values to estimate a finite vector of parameters, and for repeatedly dynamically adapting a model that relates a third value representing the systems layer bit rate to a fourth value representing the elementary stream layer bit rate, wherein the model comprises the estimated vector of parameters and a function, wherein the function can be applied to the estimated vector of parameters and one of the third or fourth values to derive the other of the third and fourth values, and a rate shaper for repeatedly using one of the third value or the fourth value to control the systems layer bit rate, the elementary stream layer bit rate, or both, during a time interval following the given time interval.

11. The system of claim 10 wherein the model is of the following form with the vector of parameters derived from first and second values:

$$g_0(R_E, R_T) = g^T(R_E, R_T)\theta$$

where: $g(R_E, R_T) = (g_1(R_E, R_T))^T$ $R_E$ is the fourth value, $R_T$ is the third value corresponding to $R_E$, $\theta$ is the vector of $M \geq 1$ parameters, $\theta_i$ is an $i^{th}$ parameter of the vector $\theta$, where $1 \leq i \leq M$, and $g_0, g_1, \ldots, g_M$ are known continuous functions.

12. The system of claim 10 wherein the model is a linear model:

$$R_T = \alpha R_E \text{ or } R_E = R_T/\alpha$$

where: $R_E$ is the fourth value, $R_T$ is the third value corresponding to $R_E$, $\alpha$ is the sole dynamically adjustable parameter of the vector of parameters.

13. The method of claim 10 wherein the model is an affine model:

$$R_T = \alpha R_E + \beta \text{ or } R_E(R_T - \beta)/\alpha$$

where: $R_E$ is the fourth value, $R_T$ is the third value corresponding to $R_E$, $\alpha$ and $\beta$ are the dynamically adjustable parameters of the vector of parameters.

14. The system of claim 10 wherein the model is a non-linear square root model:

$$R_T = \alpha R_E + \gamma R_E^{1/2} + \beta \quad \text{or} \quad R_E\{((\gamma^2 + 4\alpha(R_T - \beta))^{1/2} - \gamma)/(2\alpha)\}^2$$

where: $R_E$ is the fourth value, $R_T$ is the third value corresponding to $R_E$, $\alpha$, $\beta$ and $\gamma$ are the dynamically adjustable parameters of the vector of parameters.

15. The system of claim 10 wherein the model is a non-linear rate dependent ratio model:

$$R_T = (\alpha + \gamma/R_T)R_E + \beta,$$

such that:

$$R_T = (\beta + \alpha R_E + ((\beta + \alpha R_T)^2 + 4\gamma R_E)^{1/2})/2 \text{ or } R_E = ((R_T - \beta)R_T)/(\alpha R_T + \gamma),$$

where: $R_E$ is the fourth value, $R_T$ is the third value corresponding to $R_E$, $\alpha$, $\beta$ and $\gamma$ are the dynamically adjustable parameters of the vector of parameters.

16. The system of claim 11 wherein the rate controller is also for obtaining a window of N−1 pairs of first and second values $(R_{Tn}, R_{En})$ of the vectors $R_T$ and $R_E$, respectively, each pair of first and second values being measured at a different time interval n, where $0 \leq n \leq N$ and deriving the vector of parameters $\theta$ from:

$$\theta = (A^T A)^{-1} A^T b$$

where: $b = (g_0(R_{E0}, R_{T0}), g_0(R_{E1}, R_{T1}), \ldots, g_0(R_{EN}, R_{TN}))^T$ A is a matrix of full column rank M, and $A = (g(R_{E0}, R_{T0}), g(R_{E1}, R_{T1}), \ldots, g(R_{EN}, R_{TN}))^T$.

17. The system of claim 11 wherein the rate controller is also for deriving the vector of parameters $\theta_{n+1}$, for use in the $n+1^{th}$ time interval, from the first and second values $R_{Tn}$, $R_{En}$, obtained in the $n^{th}$ given time interval from:

$$\theta_{n-1} = \theta_n - \eta e_n g^T(R_{En}, R_{Tn})/(\alpha + g^T(R_{En}, R_{Tn}) \times g(R_{En}, R_{Tn}))$$

where: $e_n = g_0(R_{En}, R_{Tn}) - g^T(R_{En}, R_{Tn}) \times \theta_n$, $\theta_n$, is a vector of parameters used in the $n^{th}$ given time interval, $\eta$ is a gain factor selected such that $0 < \eta < 2$, and $\alpha$ is a positive number.

18. The system of claim 11 wherein the rate controller is also for deriving the vector of parameters $\theta_n$ for use in the $n^{th}$ time interval from the first and second values $R_{Tn}$, $R_{En}$ obtained in the n given interval from:

$$\theta_n = \theta_{n-1} + \frac{P_{n-1}g(R_{En}, R_{Tn})}{\lambda + g^T(R_{En}, R_{Tn})P_{n-1}g(R_{En}, R_{Tn})} e_n;$$

where: $\theta_0$ is the initial estimate of the parameter $P_n$ is an M×M matrix recursively defined by:

$$P_n = \lambda^{-1} P_{n-1} - \lambda^{-1}\left(\frac{P_{n-1}g(R_{En}, R_{Tn})g^T(R_{En}, R_{Tn})P_{n-1}}{\lambda + g^T(R_{En}, R_{Tn})P_{n-1}g(R_{En}, R_{Tn})}\right),$$

$$e_n = g_0(R_{En}, R_{Tn}) - g^T(R_{En}, R_{Tn})\theta_{n-1}.$$

$P_{-1}$ is equal to any positive definite matrix, and $\lambda$ is a forgetting factor set to $0<\lambda\leq 1$.

19. A signal generated by the method of claim 1.

20. A receiver comprising an input capable of receiving the signal of claim 19.

21. A method comprising the step of receiving at a receiver input the signal of claim 19.

* * * * *